(12) United States Patent
Zhang et al.

(10) Patent No.: US 7,803,225 B2
(45) Date of Patent: Sep. 28, 2010

(54) NON-EFFLORESCING CEMENTITIOUS MORTAR COMPOSITIONS

(75) Inventors: Mingliang Zhang, Shanghai (CN); Jie Zhang, Shanghai (CN)

(73) Assignee: Wacker Chemie AG, Munich (DE)

( * ) Notice: Subject to any disclaimer, the term of this patent is extended or adjusted under 35 U.S.C. 154(b) by 343 days.

(21) Appl. No.: 11/817,934

(22) PCT Filed: Mar. 9, 2006

(86) PCT No.: PCT/EP2006/002178

§ 371 (c)(1),
(2), (4) Date: Sep. 6, 2007

(87) PCT Pub. No.: WO2006/094809

PCT Pub. Date: Sep. 14, 2006

(65) Prior Publication Data

US 2008/0171812 A1  Jul. 17, 2008

(30) Foreign Application Priority Data

Mar. 10, 2005  (WO) ............... PCT/EP2005/002543

(51) Int. Cl.
*C04B 7/02* (2006.01)
*C04B 7/19* (2006.01)
*C04B 7/21* (2006.01)

(52) U.S. Cl. .............. 106/655; 524/5; 524/81; 524/4; 106/658; 106/664; 106/709

(58) Field of Classification Search ......... 106/655, 106/658, 664, 709; 524/4, 5, 81
See application file for complete search history.

(56) References Cited

FOREIGN PATENT DOCUMENTS

| | | |
|---|---|---|
| BE | 509923 A | 3/1952 |
| DE | 197 11 473 A1 * | 12/1997 |
| DE | 9711473 A1 | 12/1997 |
| GB | 2360769 A | 10/2001 |
| JP | 60-251162 A | 12/1985 |
| JP | 2000-302520 A | 10/2000 |
| JP | 2006528933 | 12/2006 |
| WO | WO 2004/101464 A1 | 11/2004 |

OTHER PUBLICATIONS

Chemical Abstracts, vol. 104 [18], 364, 1986.
English Abstract corresponding to BE 509923 A.
English Abstract corresponding to DE 19711473 A.
English PAJ abstract plus machine-assisted translation corresponding to JP 2000-302520 A.
English translation corresponding to JP 60-251162.

\* cited by examiner

*Primary Examiner*—Robert D. Harlan
(74) *Attorney, Agent, or Firm*—Brooks Kushman P.C.

(57) ABSTRACT

The invention provides a non-efflorescing cementitious mortar composition, free of reactive silica material, in the form of a dry-mortar composition or an aqueous mortar composition, comprising
 a) ordinary portland cement,
 b) calcium aluminate cement,
 c) calcium sulfate, and
 d) an aqueous polymer dispersion or a water-redispersible polymer powder of polymers based on one or more monomers from the group consisting of vinyl esters, (meth)acrylates, vinyl aromatics, olefins, 1,3-dienes and vinyl halides and, if required, further monomers copolymerizable therewith.

20 Claims, No Drawings

NON-EFFLORESCING CEMENTITIOUS MORTAR COMPOSITIONS

CROSS-REFERENCE TO RELATED APPLICATION

This application is the U.S. national phase of PCT Appln. PCT/EP2006/002178 filed Mar. 9, 2006 which claims priority to PCT/EP2005/002543 filed Mar. 10, 2005.

BACKGROUND OF THE INVENTION

1. Field of the Invention

The invention concerns non-efflorescing cementitious mortar compositions in the form of a dry-mortar composition or an aqueous mortar composition, and use thereof, particularly as a decorative coating material.

2. Description of the Related Art

For traditional cementitious decorative coating materials such as color plaster, tile grout and powder paint, efflorescence is a familiar phenomenon which influences the finishing decoration effect. It is well known that calcium hydroxide produced during portland cement hydration is the source of efflorescence. Calcium hydroxide is easy to be delivered by water to the decorative material surface and will deposit as white crystalline color after water dries, which can further react with ambient carbon dioxide to form white calcium carbonate. Those white substances unevenly distributed on the color decorative material surface will affect esthetic decoration quality.

There are some methods known in the state of art to reduce or avoid efflorescence: To use low alkaline binder such as calcium sulfoaluminate cement or calcium aluminate cement which produces little or no calcium hydroxide. The use of active fillers, for example the use of reactive silica filler which reacts with calcium hydroxide with formation of calcium silicate. This reaction will consume calcium hydroxide so that efflorescence can be reduced or avoided. A sealing method, wherein the surface of a decorative coating is sealed by applying a film of an aqueous polymer emulsion material is also known.

JP 2000-302520 A discloses cement-based joint fillers with effectively controlled efflorescence, which are based on various cement materials, reactive silica acid filler, water-soluble amino resin, and an aqueous polymer dispersion or water-redispersible polymer powder.

In GB 2360769 A a non-efflorescing cementitious body is formed from portland cement, calcium aluminate cement, Ca-sulfate (e.g. gypsum), and reactive silica (e.g. blast furnace slag). Reactive silica means non-crystalline $SiO_2$, which is in a metastable phase and can slowly react with the cement hydration by-product $Ca(OH)_2$ to form hydrated calcium silicate.

Such a composition has serious disadvantages, particularly if it is applied as a thin layer decorative coating: Its adhesion, adhesion strength, and scratching resistance are very low. Because of water evaporation and substrate absorption, fresh thin layer coating will dry too fast after it is applied to the substrate, even though thickening and water retention agents are added. Since some mixing water is kept in thin layer mortar, the degree of cement hydration in early stages is very low. The reaction between the potential reactive filler and calcium hydroxide is also limited.

In JP-A 60-251162 a mortar composition for decorating building walls is described containing a polyacrylate dispersion, which shows no efflorescence.

SUMMARY OF THE INVENTION

An object of the invention is to provide a non-efflorescing cementitious mortar composition in the form of a dry-mortar composition or an aqueous mortar composition, without using ingredients like reactive silica material or water-soluble amino resins. In particular, this composition should prevent efflorescence even if it is used as a thin-layer decorative coating material.

DETAILED DESCRIPTION OF THE PREFERRED EMBODIMENTS

The invention provides a non-efflorescing cementitious mortar composition, free of reactive silica material, in the form of a dry-mortar composition or an aqueous mortar composition, comprising a) from 1% by weight to 10% by weight of ordinary portland cement, based on the dry weight of the cementitious mortar composition b) from 1% by weight to 30% by weight of calcium aluminate cement, based on the dry weight of the cementitious mortar composition c) from 1% by weight to 15% by weight of calcium sulfate, based on the dry weight of the cementitious mortar composition and d) from 0.5% by weight to 30% by weight, based on the dry weight of the cementitious mortar composition, of an aqueous polymer dispersion or a water-redispersible polymer powder of polymers based on one or more monomers from the group consisting of vinyl esters, (meth)acrylates, vinyl aromatics, olefins, 1,3-dienes and vinyl halides and, if required, further monomers copolymerizable therewith.

The composition contains from 1% by weight to 10% by weight of ordinary portland cement a), preferably 1% by weight to 5% by weight, most preferably 2% by weight to 5% by weight, in each case based on the dry weight of the cementitious mortar composition. The main component of ordinary portland cement is calcium silicate ($3CaO.SiO_2$ and $2CaO.SiO_2$), which will hydrate with water to produce hydrated calcium silicate gel and a small amount of calcium hydroxide which contributes to an initial alkaline environment. Initial alkalinity is important for thickening and water retention effects. Later, calcium hydroxide will react with hydrated calcium aluminate and calcium sulfate to form ettringite or mono aluminate sulfate. In a preferred embodiment the content of $Fe_2O_3$ in the portland cement should be less than 2.5% by weight, based on the total weight of portland cement. Most preferred is white ordinary portland cement.

The composition contains from 1% by weight to 30% by weight of calcium aluminate cement b), preferably 1% by weight to 20% by weight, and most preferably 5% by weight to 20% by weight, in each case based on the dry weight of the cementitious mortar composition. In a further preferred embodiment the $Al_2O_3$ content of the calcium aluminate cement b) should not be less than 40% by weight of the weight of component b), and the $Fe_2O_3$ content of the calcium aluminate cement b) should be less than 3% by weight of component b). Preferred calcium aluminate cements are for example Secar 51 or Secar 71 (products of Lafarge Calcium Aluminates Inc.).

Suitable sources of calcium sulfate are anhydrite, hemihydrate, and gypsum. The composition contains from 1% by weight to 15% by weight of calcium sulfate c), preferably 1.5% by weight to 7.5% by weight, most preferred 3% by weight to 7.5% by weight, in each case based on the dry weight of the cementitious mortar composition. In a further preferred embodiment the $SO_3$ content of the calcium sulfate should not be less than 50% of the weight of component c).

The composition contains from 0.5% by weight to 30% by weight of an aqueous polymer dispersion or a water-redispersible polymer powder, preferably 1.5% by weight to 15% by weight, based on the dry weight of the cementitious mortar composition. In the case of aqueous polymer dispersions the amount in % by weight refers to the solids content of the polymer dispersions.

Examples of suitable home- and copolymers are vinyl acetate homopolymers, copolymers of vinyl acetate with ethylene, copolymers of vinyl acetate with ethylene and with one or more other vinyl esters, copolymers of vinyl acetate with ethylene and (meth)acrylic ester, copolymers of vinyl acetate with (meth)acrylates and other vinyl esters, copolymers of vinyl acetate with ethylene and vinyl chloride, copolymers of vinyl acetate with acrylates, styrene-acrylic ester copolymers, styrene-1,3-butadiene copolymers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more other comonomers from the group of vinyl esters having from 1 to 12 carbon atoms in the carboxylic acid radical, e.g. vinyl propionate, vinyl laurate, and vinyl esters of alpha-branched carboxylic acids having from 9 to 13 carbon atoms, such as VeoVa® 69, VeoVa® 10, VeoVa® 611 (trademarks of Resolution Performance Products); copolymers of vinyl acetate, from 1 to 40% by weight of ethylene, and preferably from 1 to 60% by weight of acrylic esters of unbranched or branched alcohols having from 1 to 15 carbon atoms, in particular n-butyl acrylate or 2-ethylhexyl acrylate; and copolymers using from 30 to 75% by weight of vinyl acetate, from 1 to 30% by weight of vinyl laurate or vinyl esters of an alpha-branched carboxylic acid having from 9 to 11 carbon atoms, and also from 1 to 30% by weight of acrylic esters of unbranched or branched alcohols having from 1 to 15 carbon atoms, in particular n-butyl acrylate or 2-ethylhexyl acrylate, where these also contain from 1 to 40% by weight of ethylene; copolymers comprising vinyl acetate, from 1 to 40% by weight of ethylene, and from 1 to 60% by weight of vinyl chloride; where the % by weight data in each case give a total of 100% by weight.

Preference is also given to copolymers of n-butyl acrylate or 2-ethylhexyl acrylate, or copolymers of methyl methacrylate with n-butyl acrylate and/or 2-ethylhexyl acrylate; styrene-acrylic ester copolymers comprising one or more monomers from the group of methyl acrylate, ethyl acrylate, propyl acrylate, n-butyl acrylate, 2-ethylhexyl acrylate; vinyl acetate-acrylic ester copolymers using one or more monomers from the group of methyl acrylate, ethyl acrylate, propyl acrylate, n-butyl acrylate, 2-ethylhexyl acrylate, and, where appropriate, ethylene; and styrene-1,3-butadiene copolymers; where the % by weight data in each case give a total of 100% by weight.

Aqueous polymer dispersions and the water-redispersible powders of the abovementioned polymers that are obtainable from them by drying are known and are available commercially.

The polymers are prepared in a conventional manner, preferably by the emulsion polymerization process. The dispersions may be stabilized with emulsifier or else with a protective colloid, an example being polyvinyl alcohol.

In a particularly preferred embodiment the polymer-cement-factor, that means the weight ratio a):b):c):d) of the components a), b), c) and d) is 1 to 1.5:2 to 4:1 to 1.5:2 to 4.

The non-efflorescing cementitious mortar compositions may contain further ingredients from the group of fillers, pigments, thickeners, retardants, antifungal agents, wetting agents or dispersing agents.

Suitable fillers include talc, mica, calcium carbonate, and sand. If the particle size is 200 to 800 mesh, these compounds can be used as fine fillers in thin layer coatings. If a coarse decoration effect is needed in coating compositions, calcium carbonate or quartz sand of coarse size can be used. Normally, maximum size of coarse filler is less than 4 mm. Preferably the fillers are used in a proportion from 25% by weight to 80% by weight, based on the dry weight of the cementitious mortar composition.

Pigments like titanium oxide or ferrite oxide can be added for color effect. Maximum amount should be no more than 8% by weight, based on the total dry-weight of the composition.

For good workability, thickeners may be added, for example methylcellulose ether. Suitable methylcellulose ethers are commercially available, for example MKX 15000 PF 20L or Bermocol 451 FQ. Its proportion depends on the use of the composition and should preferably be from 0.01% by weight to 1.5% by weight, based on the dry weight of the cementitious mortar composition. Low amounts are preferred for tile adhesives and high amounts for plaster and powder paints.

Suitable inorganic thickeners like hectorite are typically used in a proportion from 0.01% by weight to 0.5% by weight, based on the dry weight of the cementitious mortar composition.

Further ingredients are retardants like fruit acids, preferably tartaric acid, typically in a proportion from 0.01% by weight to 0.5% by weight, based on the dry weight of the cementitious mortar composition. Antifungal agents may be added to the composition, and can be used in liquid form or powder form, in a proportion of 0.05% by weight to 0.3% by weight, based on the dry weight of the cementitious mortar composition. Wetting agents or dispersing agents can be used if very fine filler is used. Typical examples are moderately condensed length polysodium phosphate, and polysodium acrylate. The proportion is preferably from 0.1% by weight to 0.3% by weight, based on the dry weight of the cementitious mortar composition.

If component d) is used in the form of a redispersible polymer powder, the non-efflorescing cementitious mortar composition is generally prepared by mixing components a) to d), and optionally one or more of the abovementioned further ingredients, to a dry mortar in conventional powder mixers and homogenizing the mixture. The amount of water needed for processing is added immediately prior to processing. Another possible procedure is to add individual components only subsequently to the mixture prepared by stirring with water.

If component d) is used in the form of an aqueous polymer dispersion, the components a) to d), and optionally further ingredients, and if necessary an additional amount of water are mixed to obtain a pasty mortar. The water ratio to be added to the dry mix depends on the type of application. Usually water is added in an amount of 10% by weight to 100% by weight, based on the dry weight of the cementitious mortar composition.

The non-efflorescing cementitious mortar compositions can be used in their typical applications, for example, for producing building adhesives, especially tile adhesives and exterior insulation system adhesives, plasters and renders, knifing fillers, flooring screeds, leveling compounds, sealing slurries, jointing mortars and coatings. Preferably they are used in coatings, particularly powder paints, and most preferably for the production of coatings.

In coatings, the non-efflorescing cementitious mortar compositions are applied in general in layers of 0.1 to 30 mm; for plaster, preferably in layers of 1 to 5 mm. In thin-layer coating materials, the compositions are applied in layers from 0.1 to 3 mm on various substrates. They are commonly used for internal and external skimming on plastered and concrete surfaces (skim coat).

EXAMPLES

The redispersible polymer powder used in the formulations of the examples was a copolymer of vinyl acetate, ethylene and versatic acid vinyl ester (VeoVa® 10, a tradename of Resolution Performance Products).

For the purpose of testing, the following powder paint formulations were prepared, and mixed with the amount of water according to table 1:

For the testing of efflorescence a black pigment is used in the formulation to differentiate more easily between efflorescence and non-efflorescence.

TABLE 1

| Formulation | Example 1 | Com. Ex. 2 |
| --- | --- | --- |
| Portland cement (OPC) | 50 | 50 |
| Aluminate cement (Secar 71) | 150 | 150 |
| Gypsum (hemihydrate) | 50 | 50 |
| Ground granulated blast | | 50 |
| Redispersible polymer powder | 150 | |
| Dispelair 429 | 10 | 10 |
| FQ 451 | 2 | 2 |
| Defoamer (Agitan 803) | 10 | 10 |
| Titanium dioxide (Kronos 2190) | 30 | 30 |
| Ferrite oxide (black pigment, Bayer) | 30 | 30 |
| Polysodium phosphate (Polyro N) | 2 | 2 |
| Polysodium acrylate (LOPON 892) | 3 | 3 |
| Tartaric acid | 2 | 2 |
| Lithium based clay (Bentone OC) | 1 | 1 |
| Limestone (500 mesh) | 510 | 610 |
| TOTAL | 1000 | 1000 |
| Water | 1000 | 1000 |

The test samples were prepared according to Chinese standard GB/T 9755-2001 (synthetic resin emulsion coating for exterior walls). Cement asbestos boards with a size of 430 mm×150 mm×5 mm were used as the substrate. Before testing, the boards were kept in water until the pH on their surface was about 7. The paint formulation was applied with two passes. The thickness of the first layer was 0.12 mm. After drying under standard conditions the second layer was applied with a thickness of 0.08 mm. The test samples were exposed outdoors for 6 days. Each day the samples were sprayed with water 3 times for 10 minutes (7:00-7:10, 13:00-13:10, 19:00-19:10). The samples were positioned at 30 degrees against a wall. For spraying with water a PVC pipe was placed on the upper end of the samples, with holes 3 mm in diameter at a distance of 40 mm. After 6 days the surface quality of the samples was checked.

Example 1

The test sample coated with the formulation of example 1 showed no obvious color changes. The color of the whole surface was even.

Comparison Example 2

The test sample coated with the formulation of comparison example 2 showed an uneven and lighter color. The surface color was partly white and light, and water marks occurred.

For the purpose of testing, the following decorative plaster formulations were prepared, and mixed with the amount of water according to table 2:

TABLE 2

| Formulation | Example 3 | Com. Ex. 4 |
| --- | --- | --- |
| Portland cement (OPC) | 40 | 40 |
| Aluminate cement (Secar 71) | 120 | 120 |
| Gypsum (anhydrite) | 40 | 40 |
| Ground granulated blast | | 40 |
| Tartaric acid | 1.5 | 1.5 |
| Thickener (MKX 15000 PP 20) | 1 | 1 |
| Redispersible polymer powder | 40 | |
| Natural cellulose fiber (PWC 500) | 8 | 8 |
| Antifungal agent (ALGON P) | 1 | 1 |
| Lithium based clay (Bentone OC) | 0.5 | 0.5 |
| Talc (−0.045 mm) | 20 | 20 |
| Sericite (−0.040 mm) | 20 | 20 |
| Limestone (325 mesh) | 168 | 168 |
| Silica sand (−0.6 mm) | 350 | 350 |
| Silica sand (0.5-1.5 mm) | 100 | 100 |
| Silica sand (1.2-2.5 mm) | 50 | 50 |
| Ferrite red (Bayer) | 40 | 40 |
| TOTAL | 1000 | 1000 |
| Water | 240 | 240 |

Standard concrete slabs were made according to EN 1323, and were used as substrates. The slabs were coated with a white primer coating. After drying of the primer, the decorative plaster was applied as a single layer. The thickness of the layer corresponds with the largest size of sand in the formulation.

The primer had the following composition:

| Primer formulation | |
| --- | --- |
| Portland cement (OPC) | 40 |
| Aluminate cement (Secar 71) | 120 |
| Gypsum (anhydrite) | 40 |
| Tartaric acid | 1.5 |
| Thickener (MKX 15000 PP 20) | 3.5 |
| Redispersible polymer powder | 100 |
| Lithium based clay (Bentone OC) | 0.5 |
| Antifoaming agent (Agitan P 803) | 5 |
| Sericite (−0.040 mm) | 50 |
| Limestone (325 mesh) | 340 |
| Silica sand (−0.6 mm) | 300 |
| TOTAL | 1000.5 |
| Water | 1000 |

The test samples were exposed outdoors for 6 days. Each day the samples were sprayed with water 3 times for 10 minutes (7:00-7:10, 13:00-13:10, 19:00-19:10). The samples were positioned at 30 degrees against a wall. For spraying with water a PVC pipe was placed on the upper end of the samples, with holes 3 mm in diameter at a distance of 40 mm. After 6 days the surface quality of the samples was checked.

Example 3

The concrete slab was coated with the plaster formulation of example 3: The surface showed no obvious color changes. The color of the whole surface was even.

Comparison Example 4

The concrete slab was coated with the formulation of comparison example 4. The surface color was partly white and light.

For the purpose of testing, the following tile grout formulations were prepared, and mixed with the amount of water according to table 3:

TABLE 3

| Formulation | Example 5 | Com. Ex. 6 |
|---|---|---|
| Portland cement (OPC) | 60 | 320 |
| Aluminate cement (Secar 71) | 180 | |
| Gypsum (anhydrite) | 60 | |
| Tartaric acid | 1.5 | |
| Thickener (MKX 15000 PP 20) | 0.2 | 0.2 |
| Redispersible polymer powder | 25 | 25 |
| PWC 500 | 8 | 8 |
| Antifungal agent (ALGON P) | 1 | 1 |
| Lithium based clay (Bentone OC) | 0.5 | 0.5 |
| Talc (−0.045 mm) | 20 | 20 |
| Sericite (−0.040 mm) | 20 | 20 |
| Limestone (325 mesh) | 173.8 | 155.3 |
| Silica sand (−0.6 mm) | 400 | 400 |
| Ferrite red (Bayer) | 50 | 50 |
| TOTAL | 1000 | 1000 |
| Water | 180 | 180 |

Standard concrete slabs were made according to EN 1323, and were used as substrates. With thin bed cementitious tile adhesive, stoneware tiles were fixed on the substrate. After 24 hours the tile grout was applied with a rubber trowel to fill the tile joints, and 20 minutes later the tile surface was cleaned with a wet sponge.

The tiles were exposed outdoors for 6 days. Each day the samples were sprayed with water 3 times for 10 minutes (7:00-7:10, 13:00-13:10, 19:00-19:10). The samples were positioned at 30 degrees against a wall. For spraying with water a PVC pipe was placed on the upper end of the samples, with holes 3 mm in diameter at a distance of 40 mm.

After 6 days the surface quality of the samples was checked.

Example 5

The tile joints were filled with the tile grout formulation of example 5: The joints filled with the tile grout showed no obvious color changes.

Comparison Example 6

The tile joints were filled with the tile grout formulation of comparison example 6: The surface color of the tile joints was partly white and light.

Testing of tensile strength:

For outdoor application of finishing decorative material such as decorative plaster, tensile adhesion strength is an important parameter. Decorative plaster is normally used in a thin layer, therefore long term adhesion strength under critical application condition is very important.

For testing of tensile strength the decorative plaster formulations of table 2 were used. Standard concrete slabs were made according to EN 1323, and used as substrates. The slab was coated with a white primer coating with the formulation given above. After drying of the primer, the decorative plaster was applied as a single layer with a sample size of 40 mm×40 mm×2 mm.

The test was performed according to JIS A 6909-1995:

In a first cycle A the samples were stored for 14 days under standard conditions.

In a second cycle B the samples were stored for 7 days under standard conditions, followed by 10 days water immersion at standard conditions, 1 day storage at 70° C. and finally 1 day storage at standard conditions.

In a third cycle C after storing for 7 days under standard conditions, 10 cycles followed in each case with 18 hours water immersion, 3 hours freezing, and 3 hours storage at 70° C. After the 10 cycles the test was finished with 1 day of storage at standard conditions.

Standard conditions mean 23° C. and 50% relative humidity. For testing, a steel coupon was applied to the samples with an epoxy adhesive, and the tests were performed with a Herion tester HP 850, selecting a piston thrust of 9.5 kN and a loading speed of 250 N/s.

Test results:

| | Example 3 | Comp. Example 4 |
|---|---|---|
| Cycle A | 0.76 N/mm$^2$ | 0.10 N/mm$^2$ |
| Cycle B | 1.83 N/mm$^2$ | 0.00 N/mm$^2$ Samples falling off during storage |
| Cycle C | 1.14 N/mm$^2$ | 0.00 N/mm$^2$ Samples falling off during storage |

Testing of wet scrub resistance:

Wet scrub resistance reflects the cohesive strength of thin coating materials. The test was performed with the powder paint formulations of example 1 and comparison example 2 as given in table 1.

The test samples were prepared according to Chinese standard GB/T 9755-2001 (synthetic resin emulsion coating for exterior wall). Cement asbestos boards with a size of 430 mm×150 mm×5 mm were used as substrate. Before testing, the boards were kept in water until the pH on their surface was about 7. The paint formulation was applied with two passes. The thickness of the first layer was 0.12 mm. After drying under standard conditions the second layer was applied with a thickness of 0.08 mm.

The samples were stored under two different conditions:

Storage A: 7 days at standard conditions.

Storage B: 1 day at standard conditions followed by 6 days outdoors with intermittent water spraying.

The scrub resistance was determined following the Chinese standard GB 9266-1988: Each sample was scrubbed until the substrate was exposed to 100 mm width. The scrub cycles to reach this result were recorded.

Test results:

| | Example 1 | Comp. Example 2 |
|---|---|---|
| Storage A | 3236 cycles | 10 cycles |
| Storage B | 10000 cycles | 25 cycles |

The invention claimed is:

1. A non-efflorescing cementitious mortar composition, free of reactive silica material, in the form of a dry-mortar composition or an aqueous mortar composition, comprising
    a) from 1% by weight to 10% by weight of ordinary portland cement, based on the dry weight of the cementitious mortar composition
    b) from 1% by weight to 30% by weight of calcium aluminate cement, based on the dry weight of the cementitious mortar composition
    c) from 1% by weight to 15% by weight of calcium sulfate, based on the dry weight of the cementitious mortar composition and
    d) from 0.5% by weight to 30% by weight, based on the dry weight of the cementitious mortar composition, of an aqueous polymer dispersion or a water-redispersible polymer powder of polymers based on one or more monomers from the group consisting of vinyl esters, (meth)acrylates, vinyl aromatics, olefins, 1,3-dienes and vinyl halides and, if required, further monomers copolymerizable therewith, the weight percentage of aqueous polymer dispersion based on the weight of solids in the dispersion, wherein reactive silica material means non-crystalline silica which is in metastable form and can react with cement hydration product calcium hydroxide to form hydrated calcium silicate, and wherein in the cementitious mortar composition, the components a), b), c) and d) are present in a weight ratio of a):b):c):d) of 1 to 1.5:2 to 4:1 to 1.5:2 to 4.

2. The cementitious mortar composition of claim 1, comprising as calcium sulfate c), anhydrite, hemi-hydrate, and/or gypsum.

3. The cementitious mortar composition of claim 1, comprising one or more polymers selected from the group consisting of vinyl acetate homopolymers; copolymers of vinyl acetate with ethylene; copolymers of vinyl acetate with ethylene and with one or more other vinyl esters; copolymers of vinyl acetate with ethylene and (meth)acrylic ester; copolymers of vinyl acetate with (meth)acrylates and other vinyl esters; copolymers of vinyl acetate with ethylene and vinyl chloride; copolymers of vinyl acetate with acrylates; styrene-acrylic ester copolymers; and styrene-1,3 butadiene copolymers.

4. The cementitious mortar composition of claim 1, comprising one or more further ingredients selected from the group of fillers, pigments, thickeners, retardants, antifungal agents, wetting agents and dispersing agents.

5. A process for the preparation of a cementitious mortar composition as claimed in claim 1, comprising mixing components a) to d), and optionally one or more of the abovementioned further ingredients, to form a dry mortar in a powder mixer, and homogenizing the mixture.

6. A process for the preparation of a cementitious mortar composition as claimed in claim 1, comprising mixing the aqueous polymer dispersion d) with the components a) to c), and optionally further ingredients, and if necessary an additional amount of water to obtain a pasty mortar.

7. A building adhesive, plaster, render, knifing filler, flooring screed, leveling compound, sealing slurry, jointing mortar and coating, comprising a cementitious mortar composition of claim 1.

8. A powder paint, comprising a cementitious mortar composition of claim 1.

9. A thin layer coating having a thickness of 0.1 to 3 mm, comprising a cementitious mortar composition of claim 1.

10. The composition of claim 1, wherein the portland cement contains $Fe_2O_3$ in an amount of less than 2.5% by weight based on the weight of portland cement.

11. The composition of claim 1, wherein the calcium aluminate cement contains $Fe_2O_3$ in an amount of less than 3 weight percent based on the weight of the calcium aluminate cement.

12. The composition of claim 10, wherein the calcium aluminate cement contains $Fe_2O_3$ in an amount of less than 3 weight percent based on the weight of the calcium aluminate cement.

13. A non-efflorescing cementitious mortar composition, free of reactive silica material, in the form of a dry-mortar composition or an aqueous mortar composition, comprising
    a) from 1% by weight to 10% by weight of ordinary portland cement, based on the dry weight of the cementitious mortar composition
    b) from 1% by weight to 30% by weight of calcium aluminate cement, based on the dry weight of the cementitious mortar composition
    c) from 1% by weight to 15% by weight of calcium sulfate, based on the dry weight of the cementitious mortar composition and
    d) from 0.5% by weight to 30% by weight, based on the dry weight of the cementitious mortar composition, of an aqueous polymer dispersion or a water-redispersible polymer powder of polymers based on one or more monomers from the group consisting of vinyl esters, (meth)acrylates, vinyl aromatics, olefins, 1,3-dienes and vinyl halides and, if required, further monomers copolymerizable therewith, the weight percentage of aqueous polymer dispersion based on the weight of solids in the dispersion, wherein reactive silica material means non-crystalline silica which is in metastable form and can react with cement hydration product calcium hydroxide to form hydrated calcium silicate, and wherein in the cementitious mortar composition, the components a), b), c) and d) are present in a weight ratio of a):b):c):d) of 1 to 1.5:2 to 4:1 to 1.5:2 to 4,
and comprising as calcium sulfate c), anhydrite, hemi-hydrate, or gypsum.

14. The cementitious mortar composition of claim 2, comprising one or more polymers selected from the group consisting of vinyl acetate homopolymers; copolymers of vinyl acetate with ethylene; copolymers of vinyl acetate with ethylene and with one or more other vinyl esters; copolymers of vinyl acetate with ethylene and (meth)acrylic ester; copolymers of vinyl acetate with (meth)acrylates and other vinyl esters; copolymers of vinyl acetate with ethylene and vinyl chloride; copolymers of vinyl acetate with acrylates; styrene-acrylic ester copolymers; and styrene-1,3 butadiene copolymers.

15. The cementitious mortar composition of claim 3, comprising one or more further ingredients selected from the group of fillers, pigments, thickeners, retardants, antifungal agents, wetting agents and dispersing agents.

16. A building adhesive, plaster, render, knifing filler, flooring screed, leveling compound, sealing slurry, jointing mortar and coating, comprising a cementitious mortar composition of claim 7.

17. A powder paint, comprising a cementitious mortar composition of claim 8.

18. A thin layer coating having a thickness of 0.1 to 3 mm, comprising a cementitious mortar composition of claim 9.

19. The composition of claim 10, wherein the portland cement contains $Fe_2O_3$ in an amount of less than 2.5% by weight based on the weight of portland cement.

20. The composition of claim 11, wherein the calcium aluminate cement contains $Fe_2O_3$ in an amount of less than 3 weight percent based on the weight of the calcium aluminate cement.

* * * * *